March 20, 1956  G. R. ROESCH  2,738,686
BRAKE LEVER MECHANISM
Filed Nov. 10, 1952  2 Sheets-Sheet 2
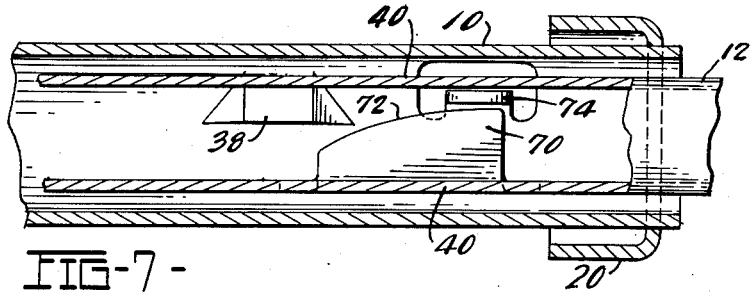
FIG-7-
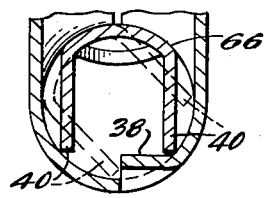
FIG-9-
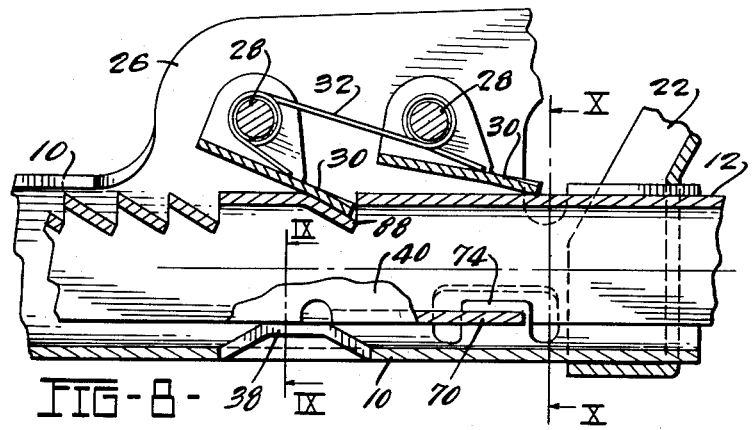
FIG-8-
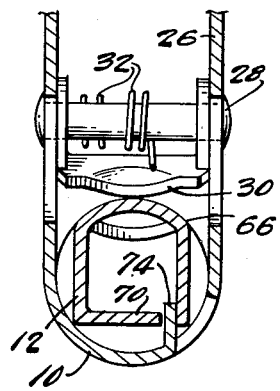
FIG-10-
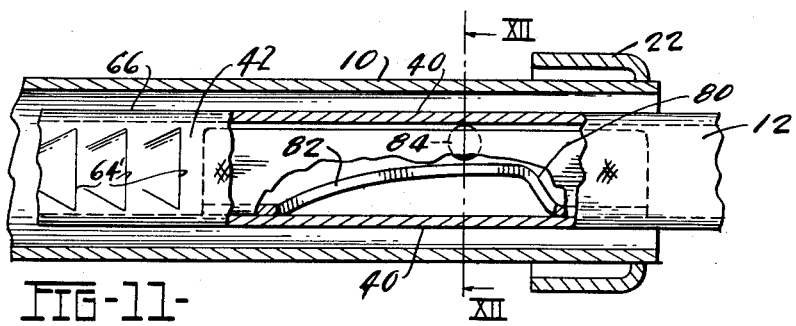
FIG-11-
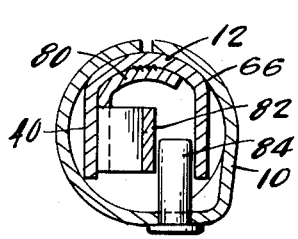
FIG-12-
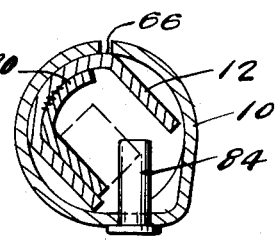
FIG-13-
INVENTOR.
George R. Roesch
BY
Wm. O. Ballard
His attorney United States Patent Office 2,738,686
Patented Mar. 20, 1956

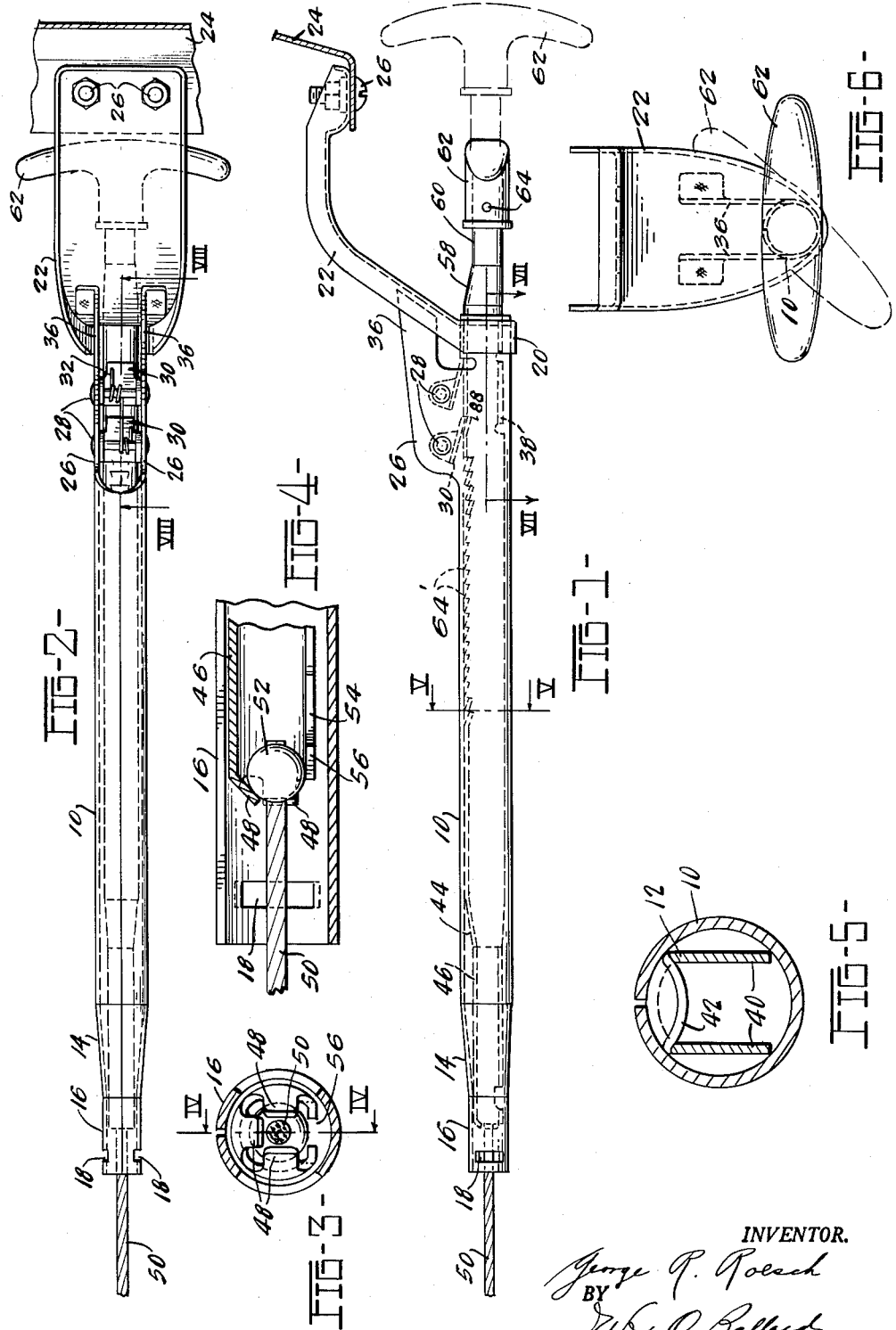

2,738,686
BRAKE LEVER MECHANISM

George R. Roesch, Toledo, Ohio, assignor to The Rush Stamping Company, Toledo, Ohio, a corporation of Ohio Application November 10, 1952, Serial No. 319,648

6 Claims. (Cl. 74—503)

This invention relates to brake levers.

This application is a continuation-in-part of my application filed August 25, 1952, which resulted in United Letters Patent No. 2,644,343, issued July 7, 1953.

An object of this invention is to provide a manually operable brake lever assembly for controlling the emergency brake mechanism of a vehicle wherein the major parts of said assembly are sheet metal stampings.

Another object of this invention is to provide a brake lever assembly composed primarily of sheet metal stampings wherein operation controlling elements are integral portions of the stampings.

Another object of this invention is to provide a brake controlling assembly having a minimum number of major parts which parts incorporate operation controls as integral portions thereof. This results in an economical construction, both in original and in assembly costs.

Another object of this invention is to provide a simplified reset for the brake lever parts, which automatically, upon release resets the parts for the subsequent brake setting operation.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of a straight line pull type of brake lever embodying features of the invention herein;

Fig. 2 is a plan view of the mechanism of Fig. 1;

Fig. 3 is an end view of the mechanism from the left of Fig. 1;

Fig. 4 is a view on the line IV—IV, Fig. 3;

Fig. 5 is a view on the line V—V, Fig. 1;

Fig. 6 is a view of the operating handle end of the mechanism from the right of Fig. 1;

Fig. 7 is a view on the line VII—VII, Fig 1;

Fig. 8 is a view on the line VIII—VIII, Fig. 2;

Fig. 9 is a view on the line IX—IX, Fig. 8;

Fig. 10 is a view on the line X—X, Fig. 8;

Fig. 11 is a view similar to Fig. 7 embodying a modified reset cam construction;

Fig. 12 is a view on the line XII—XII, Fig. 11; and

Fig. 13 is a view similar to Fig. 12 with the parts shifted to brake releasing position.

The hand brake lever assembly herein disclosed includes two major elements, a cylindrical guide tube 10 and a channel-shaped pull bar 12 reciprocably and rotatably mounted in the guide. The cylindrical guide 10 is an element provided with a forward conical portion 14 tapering downwardly to a tubular terminal extent 16. This reduced diameter portion 16 is provided with suitable apertures 18, herein shown as slots, for interlocking with a cable housing, but such terminal treatment may be modified to receive various known types of coupling elements by which a cable housing may be attached thereto.

Remote from the terminal portion 16 the guide 10 is mounted in the lower portion of bracket 20, which bracket has an extension 22 to be attached to a support 24 by suitable means, such as nut and bolt fasteners 26, the support being the instrumental panel of a motor vehicle. The bracket 20, 22 may likewise be modified for the desired mounting in various makes of motor vehicles. Adjacent the bracket 22 the tube 10 is provided with a pair of opposing upstanding flanges 26, which flanges provide a mount for pins 28 serving as axles for pawl means 30 herein shown as two in number and normally urged downwardly by means of a single spring 32 mounted by and about the pins 28. The flanges 26 are provided with extensions 36 which may be terminally attached as by welding to the bracket 22, thus providing a rear end structure of substantial strength.

The tubular guide 10 is provided with an inwardly extending offset 38 adjacent the handle end of the mechanism, which projection serves as a stop, the purpose of which is more fully described hereinafter.

The pull or slide bar 12 is also a sheet metal stamping, having its intermediate length defined by a pair of opposing sides 40 connected by a web 42, thereby providing a channel element. This channel has its forward portion include a downwardly tapered extent 44 terminating in a tubular extension 46 therefrom, which tubular extension 46 has its termini 48 configured to provide means to interlock with a terminus of a brake cable 50. The brake cable 50 is herein shown as having a ball 52 fixed thereto, which may be assembled into the tubular extension 46 by passing the ball 52 through opening 54 with the cable 50 passing through slot 56. Once the cable assembly is completed with the draw bar, the bar is pulled into the guide 10 and the guide then serves to prevent any accidental disengagement of the brake cable, even if the brake cable should become slack when the device is in full brake release position.

The bar 12 on its front or opposite end from the portion 46 has an inwardly tapered section 58 extending to a tubular terminus 60 upon which may be mounted an operating handle 62 and fixed therewith by some suitable means, such as a pin 64. This handle 62 may be of various designs to match the general hardware motif of the vehicle in which the mechanism herewith is installed. The greater length of this bar 12 extending between the sections 44 and 58 is the channel form as defined by the opposing sides 40, and the connecting web 42, which web 42 is provided with a regular series of ratchet teeth 64' to coact with the pawl means 30, so that as the bar 12 is pulled rearwardly from the housing 10, the teeth 64' will operate with the pawl means 30 in establishing incremental settings of the brake mechanism. The teeth are so designed that but one of the pawl means is in holding position at any one time, thereby allowing for a fine adjustment of the brake setting in half length tooth steps. In the brake setting, the mechanism within the brake maintains a constant pull on the cable 50 so that there is no looseness between the parts when the brake is set; furthermore, this pull resets this brake operating lever by drawing the bar 12 back into the guide 10 when the teeth 64' are detached from the pawl means 30. This detachment may be effected by a partial rotation of the handle 62, which in turn rotates the bar 12 within the guide 10. Such rotation causes the pawl means to ride upon a smooth portion of the channel member, preferably a corner 64 formed by the junction of a side 40 and the web 42.

Means are herein provided to automatically reset the handle by rotating the same in the opposite direction from the releasing movement. This is accomplished by providing a cam 70, which may be an integral tab or extension inwardly from the lower edge of one of the sides 40. It is preferable to have this cam adjacent the rear end of the bar 12 just inward from the tapered portion 58. The reset movement is thereby confined to the last portion of the movement of the bar inwardly into the guide. As the bar approaches its normal or brake released position, this cam 70 has its free edge 72 contact a projection 74 formed by turning a tab or projection from the housing 10 inwardly into the region between the bar sides 40. The speed and length of the return movement may be determined by the development of the cam edge 72, as it is obvious a long slow rotation can be had, or a quick short length reset may be had even approaching a snap action. The projection 74 being an integral part of the guide 10 and the cam 70 being an integral part of the bar 12 provides a positively maintained relationship in an extremely economical construction. The free rotation of the bar 12 within guide 10 is limited by the projection 38, also an integral projection inwardly from the housing 10. This projection 38 serves as a stop to engage either edge of the sides 40 as rotating in one or the other directions.

In some instances, it may be desirable to have the reset cam a separate piece fixedly mounted within the channel. To this end, cam member 80 may be fixed within the channel by spot welding or other suitable fastening means and include a cam face 82 of a predetermined design. In such a construction a separate projection may be provided with which the cam coacts, which projection may be a pin 84 as part of a rivet-like element mounted at the desired spot along the housing 10. In either instance, the reset mechanism is housed within the channel 12 and not only protects the same against possible damage, but hides this mechanism so that there will be no detraction from the appearance of the device disclosed. In operation, the operator of a vehicle needs only to grasp the handle 62 and pull the same, which will set the brake mechanism. When it is desired to release the mechanism, it is only necessary to turn the handle a fractional rotation, and the brake cable will pull the bar into the guide 10, and likewise the bar is free to be pushed to its return position should such an additional operation be necessary.

The limit of the inward movement of the handle 62 may be determined by the employment of an extra tooth 88 spaced rearwardly from the ratchet teeth series 64. This tooth 88 may also coact with pawl means 30 to limit the inward movement of the handle 62, beyond the release of the brakes. Also should at any time there be need for repair to the brake system requiring a disassembling of the cable 50 from the bar 12, the pawl means 30 may be manually released from the tooth 88 and the bar 12 pushed inwardly to such an extent that the portion 46 will be exposed beyond the housing portion 16, thereby allowing the brake cable to be freely removed, and when reassembled a rearward movement of the bar 12 causes the assembly 48 to be housed against an accidental or unauthorized release. The reduced bar portion 46 has its terminus nest within the cylindrical portion 16 of the housing 10 when the brake is fully released, providing insurance against rattling resulting from normal vehicle vibrations.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and desired to secure by United States Letters Patent:

1. In a brake actuating mechanism of the character described, a cylindrical guide member having its forward terminal portion comprising a minor length of reduced diameter, means engaging the opposite end of said guide member for mounting said guide member on the instrument panel of a motor vehicle, and a pull bar reciprocable and rotatable in said guide member, said bar having cylindrical terminal portions, the forward terminal portion of said bar diametrically dimensioned to nest within the reduced diameter portion of said guide when said bar is in its forwardmost position within said guide, the opposite terminus of said bar providing a mount for a handle.

2. In a brake actuating mechanism of the character described, a slide bar comprising a channel member including a pair of sides with a connecting web therebetween, said channel having a handle attached to one end and configured at its opposite end to interlock with a vehicle brake opertaing mechanism, a cylindrical guide substantially encasing said bar forward of the handle and serving to mount said bar in a manner to provide for reciprocable and rotary movements of the bar therein as directed by manual operations of said handle, means on said guide for attachment thereof to a support, pawl means carried by said guide, ratchet teeth on said web engageable by said pawl means for retaining the bar in incremental brake setting position when the bar is moved rearwardly, a fixed projection extending inwardly from said guide, and a cam on said channel positioned to engage said projection as the bar approaches its innermost position within the guide, said cam causing the bar to rotate the ratchet teeth into alignment with said pawl means.

3. In a brake actuating mechanism of the character described, a sliding bar comprising a channel member including a web with a pair of opposing sides projecting therefrom, said bar having a handle attached to one end, a brake actuating connection attached to its opposite end, a tubular housing mounting said bar for reciprocable and rotary movements of the bar therein, means extending from said housing to provide a mounting for said mechanism on a support, the said housing also provided with a portion mounting pawl means, said bar web provided with ratchet teeth coacting with said pawl means to hold said bar in incremental brake setting position longitudinally along said guide, said bar rotatable to disengage said ratchet teeth from the pawl means, and means directing said teeth into pawl engaging means as said bar is moved toward brake releasing position, said means including a projection from said guide into the channel and a cam projecting from one of said channel sides in a position to abut said projection.

4. The structure set forth in claim 3 wherein said cam comprises an extension from one of the sliding bar sides angularly therefrom into the channel.

5. The structure set forth in claim 3 wherein said cam comprises an integral extension from one of the sliding bar sides angularly offset into the channel.

6. The structure set forth in claim 3 wherein said cam comprises an extension of one of said sides angularly therefrom into the channel, and the projetcion comprises a portion of said guide housing turned inwardly into said channel, said cam providing a projection contacting face controlling the bar rotation as the bar approaches its innermost position within said guide.

References Cited in the file of this patent

UNITED STATES PATENTS

| | | |
|---|---|---|
| 1,652,794 | Piel | Dec. 13, 1927 |
| 1,709,039 | Poirmeur | Apr. 16, 1929 |
| 2,532,975 | Weber | Dec. 5, 1950 |
| 2,543,510 | Sandberg | Feb. 27, 1951 |
| 2,553,025 | Weber et al. | May 15, 1951 |
| 2,558,958 | Jandus et al. | July 3, 1951 |
| 2,598,133 | Roesch | May 27, 1952 |
| 2,637,218 | Hinsey | May 5, 1953 |
| 2,644,343 | Roesch | July 7, 1953 |